United States Patent [19]
Warkentin

[11] Patent Number: 5,195,628
[45] Date of Patent: Mar. 23, 1993

[54] OFF-LOADING CONVEYING SYSTEM

[76] Inventor: Aaron J. Warkentin, 13551 View Dr., Orange Cove, Calif. 93646

[21] Appl. No.: 911,766

[22] Filed: Jul. 10, 1992

[51] Int. Cl.$^5$ .............................................. B65G 47/46
[52] U.S. Cl. .................................. 198/370; 198/365; 198/779
[58] Field of Search ............... 198/365, 370, 372, 779, 198/482.1; 209/651–654, 698, 707, 912

[56] References Cited

U.S. PATENT DOCUMENTS

| | | | |
|---|---|---|---|
| 3,278,025 | 10/1966 | Willsey et al. | 209/912 X |
| 4,482,061 | 11/1984 | Leverett | 198/779 X |
| 4,595,091 | 6/1986 | Scopatz et al. | 198/372 |
| 4,940,536 | 7/1990 | Cowlin et al. | 209/912 X |
| 5,029,692 | 7/1991 | Warkentin | 198/365 |
| 5,042,637 | 8/1991 | LaVars et al. | 198/372 |

Primary Examiner—D. Glenn Dayoan
Attorney, Agent, or Firm—Lyon & Lyon

[57] ABSTRACT

An off-loading conveyor having an endless roller chain to which is mounted bow tie rollers on mounting pins extending laterally from the chain. The bow tie rollers define concavities for receipt of product units to be conveyed and off-loaded at an appropriate station. Off-loading elements are mounted about axes perpendicular to and on the chains and include downwardly inclined portions extending to between the bow tie rollers and arms which cooperate with an actuation system to pivot the downwardly inclined portions through the concavities to remove product at appropriate stations.

9 Claims, 3 Drawing Sheets

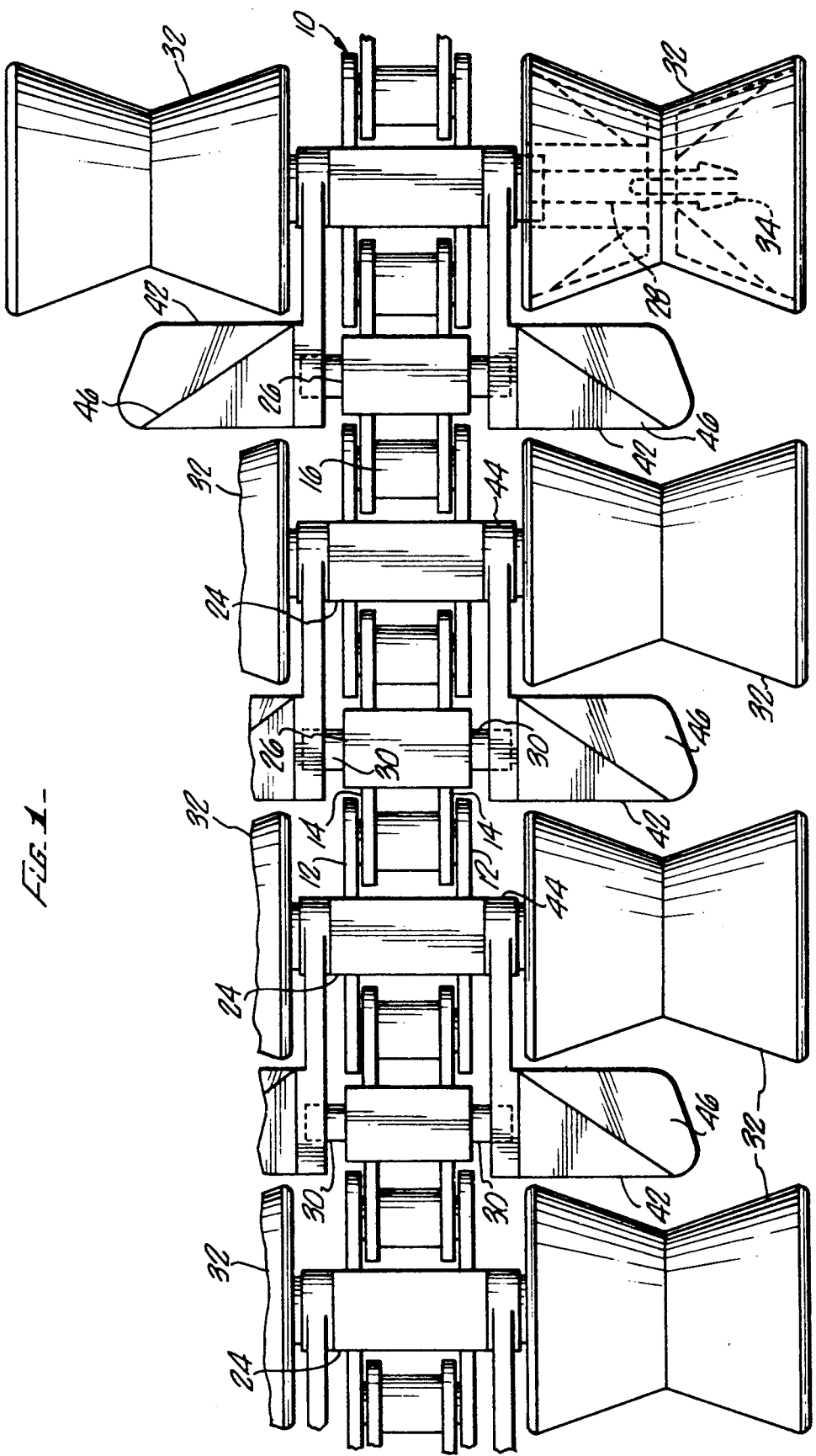

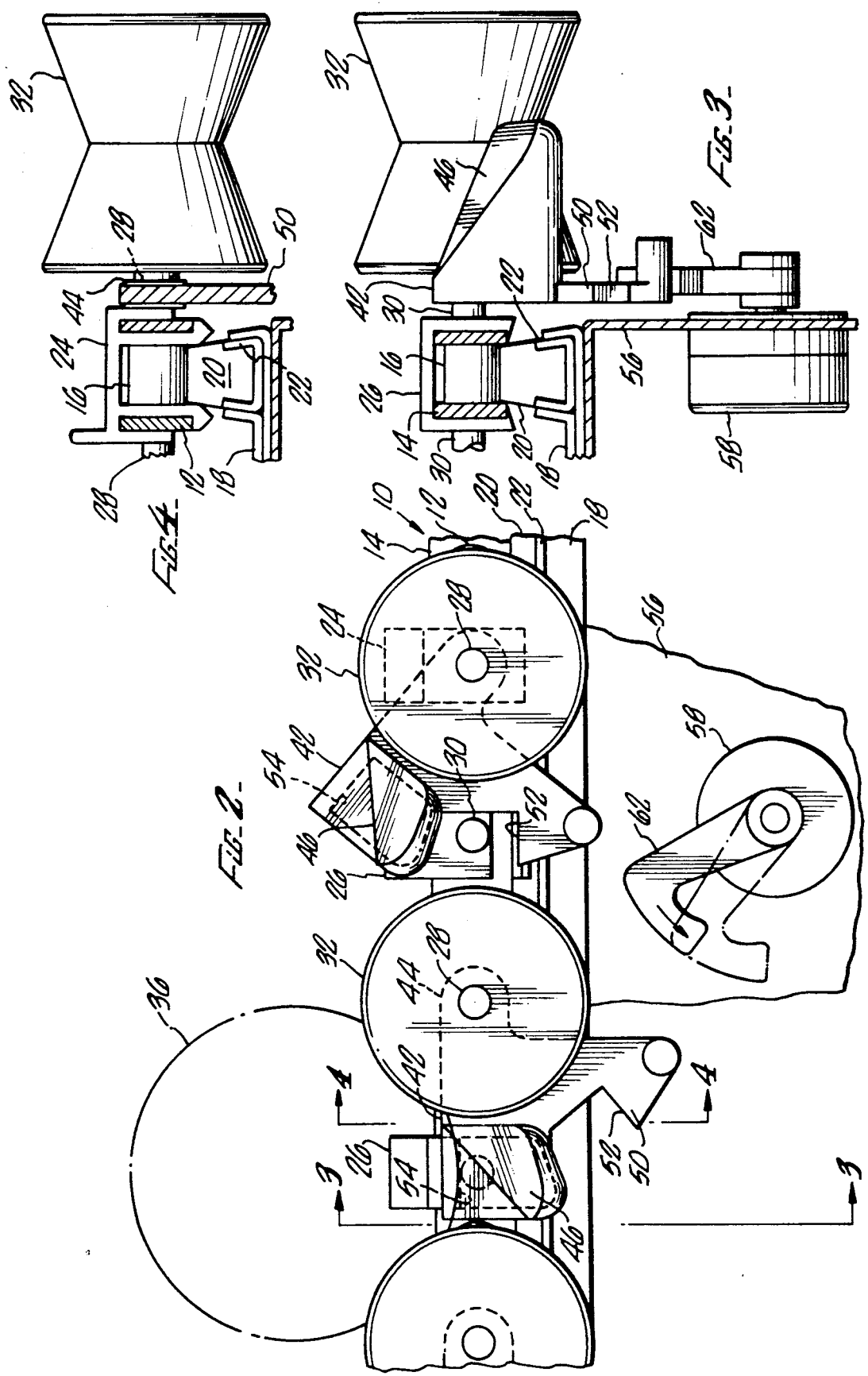

5,195,628

OFF-LOADING CONVEYING SYSTEM

BACKGROUND OF THE INVENTION

The field of the present invention is conveying systems wherein the conveyor is actively operative to off-load products from the conveying surface.

Product handling activities for the discrimination of product units have long been used, particularly in the food product industry. Such discrimination has been based on size, ripeness, color, blemishes and the like. Until recent times, this activity was generally undertaken by manual labor. The versatility of workers for handling and processing large amounts and varieties of food products has generally been unsurpassed. Such processing systems generally include conveyor passing working stations where workers were able to distinguish and separate product units. Such labor was generally inexpensive and seasonal. However, difficulties in finding experienced seasonal workers and the normal administrative problems associated with the fluctuating work force have long created a need for less labor intensive systems.

In defining the needs for product handling systems, as particularly applied to the food industry, the nature, volume, relative unit cost and variety of products severely inhibit the design of handling equipment. Most food products must be handled with great care to avoid damage. The perishable nature and large batch quantities of products in season makes rapid processing a necessity. The variety of products which must be processed at different times to economically justify a food processing facility places great demand for versatility on the equipment. Thus, a substantial challenge exists in creating handling equipment to replace the versatile human worker.

Recently, high speed electronics and sophisticated software have provided increasing sensing capability for detecting size and condition of individual product units and rapidly activating responsive mechanisms to proceed to handle such products. However, such systems require a more exacting placement of the product units, a separation of product units, proper orientation and reorientation of product units and means for quickly but gently separating units one from another. The demands for such exacting placement, control and operation are orders of magnitude more stringent than for manual processing. Thus, the design of handling systems has resulted in compromises in speed, efficiency and product treatment.

An earlier system for handling of products in a manner acceptable for automatic sorting is disclosed in U.S. Pat. No. 4,106,628 to Warkentin et al. for SORTER FOR FRUIT AND THE LIKE, the disclosure of which is incorporated herein by reference. In this patented device, cups are arranged on a chain conveyor for holding individual product units. Solenoids act to dump selected cups for product separation responsive to discriminating sensing and electronic commands. Other separating systems include devices for batting or blowing selected units from a conveyor.

Another system which has been in use for some time is disclosed in U.S. Pat. No. 4,961,489 to Warkentin for PRODUCT HANDLING SYSTEM, the disclosure of which is incorporated herein by reference. In this device, a conveyor is employed which includes elements capable of tipping to off-load individual units of a product being processed. The nature of the conveyor permits some variety in shapes and sizes, including elongated products. However, a range of round or oval products in smaller sizes is not as easily accommodated by this system.

Another system which has been in use successfully for some time is disclosed in U.S. Pat. No. 5,029,692 to Warkentin for OFF-LOADING CONVEYING SYSTEM, the disclosure of which is incorporated herein by reference. In this device, a conveyor is employed which includes concave rollers defining concavities therebetween. Off-loading elements are positioned between adjacent rollers in each of the concavities. The elements are pivotally mounted about pivot axes parallel to the conveying direction and can be actuated to off-load product units away from these pivot axes.

A system used with such conveyors for discriminating product units is disclosed in U.S. patent application No. 479,107, now U.S. Pat. No. 5,156,278, filed Feb. 13, 1990, to Warkentin et al. for PRODUCT DISCRIMINATION SYSTEM AND METHOD THEREFOR, the disclosure of which is incorporated herein by reference. A fiber optic system is used to sense physical attributes of the conveyed product units. A system for rotating the fruit between sensors provided added accuracy.

SUMMARY OF THE INVENTION

The present invention is directed to an off-loading conveyor system for the handling of a wide variety of product including small spherical and ovular shapes and easily damaged units. Off-loading elements are arranged in association with a conveyor whereby products of a wide variety of shapes can be off-loaded in a rapid manner without injury. The system lends itself to high-speed processing of a stream of product units compatible with electronic systems control.

Support elements may be mounted in association with an endless flexible member of a conveying system. The support elements define concavities therebetween. Off-loading elements extending into the concavities may be selectively actuated to void a concavity by pivoting an associated off-loading element upwardly. With axes extending perpendicularly to the conveying direction, downwardly inclined portions of the off-loading elements are raised to push product units off the conveyor away from the endless flexible member. The off-loading element itself moves upwardly away from and over an actuator. The operation of the off-loading elements may be achieved by electronic control. The off-loading elements are arranged and pivotally mounted to gently urge the product units from the conveyor.

Accordingly, it is an object of the present invention to provide an improved versatile off-loading conveying system. Other objects and advantages will appear hereinafter.

BRIEF DESCRIPTION OF THE DRAWINGS

FIG. 1 is a plan view of an off-loading conveyor of the present invention.

FIG. 2 is a elevation view of the off-loading conveyor of FIG. 1.

FIG. 3 is a cross-sectional end view taken along line 3—3 of FIG. 2.

FIG. 4 is a cross-sectional end view taken along line 4—4 of FIG. 2.

DETAILED DESCRIPTION OF THE PREFERRED EMBODIMENT

Figure 5:
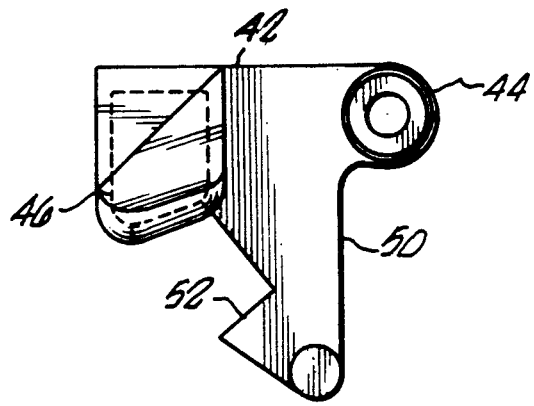
FIG. 5 is a front view of an off-loading element of the present invention.
Figure 6:
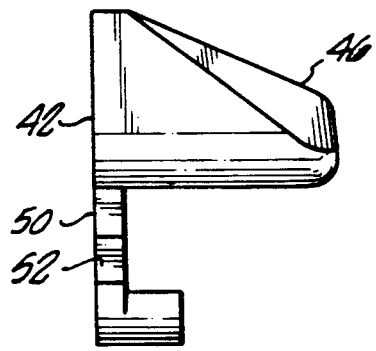
FIG. 6 is an end view of the off-loading element of FIG. 5.
Figure 7:
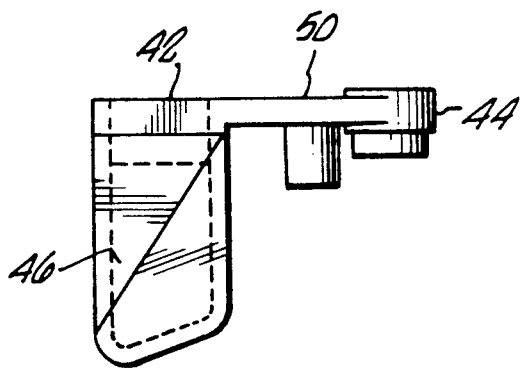
FIG. 7 is a plan view of the off-loading element of FIG. 5.
Figure 8:
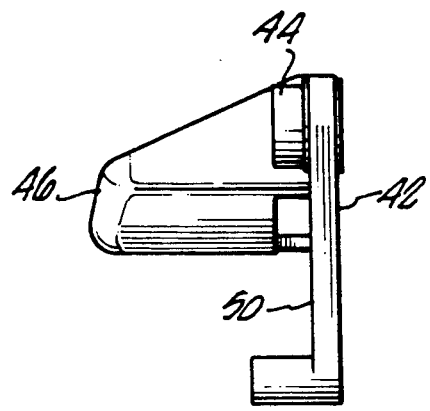
FIG. 8 is an end view of the other end of the off-loading element of FIG. 5.
Figure 9:
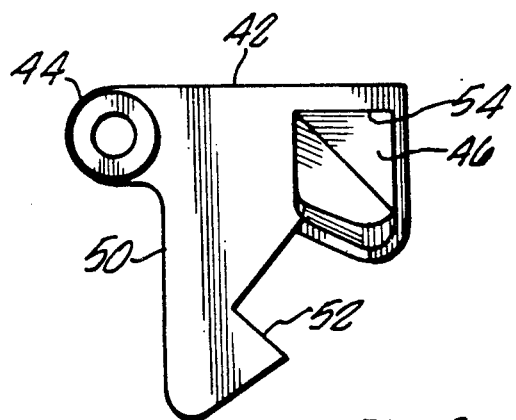
FIG. 9 is a back view of the off-loading element of FIG. 5.

Turning in detail to the drawings, an off-loading conveyor is illustrated as including an endless flexible member in the form of an endless roller chain, generally designated 10. The endless roller chain 10 includes links 12 and 14. The links 12 are made up of parallel link elements as are the links 14. The links 14 are found to have the link elements positioned inwardly of the link elements of links 12. The links 12 and 14 are connected end to end by means of rollers 16 in an overlapping arrangement. The links 12 and 14 are free to rotate relative to one another about the rollers 16 to create the appropriate flexibility in a plane perpendicular to the rollers.

A support structure 18 includes a frame structure with sprocket wheels (not shown) employed to conventionally mount the endless chain 10. A runner 20 is disposed on the upper portion of the support structure to support and guide the endless roller chain. The runner 20 is positioned on a bracket 22 associated with the support structure. This structure defines a conveying path along which the chain 10 moves.

Clamped to the links 14 are mounts 24 and 26. The mounts are U-shaped in structure with locking flanges at the ends of depending legs designed to hook under the bottom of each link. The mounts 24 have the legs thereof extending downwardly to the locking flanges inwardly of each link 12. The mounts 26 have the legs thereof extending downwardly to the locking flanges outwardly of each link 14. Each mount 24 and 26 is conveniently of resilient plastic such that the mounts may be easily snapped in place.

Each mount 24 has mounting pins 28 extending perpendicular to the chain 10. The pins 28 are shown in this embodiment to extend in both directions from the mount 24. Each mount 26 has stops 30 extending perpendicular to the chain 10 also in both directions.

Mounted on each of the pins 28 is a support 32. In the present embodiment, the support elements 32 are bow tie rollers capable of rotating on the pins 28 and being fixed from moving axially along each of the pins by retaining flanges 34. The support elements 32 include supporting surfaces, in this case defined by two abutting truncated conical members. The bow tie shape is advantageous in that the support surfaces created are inclined downwardly from either end to form a trough extending along the conveying path. This trough may receive products which span roller to roller in what may be considered a first concavity. Each support surface, from its centerline, is also inclined downwardly toward the next support element. Adjacent support elements define, by means of these supporting surfaces, additional concavities for holding units of the product. A unit of the product is schematically illustrated by the phantom line 36. As the units of product are solid, it is unnecessary to define a complete surface to the concavity. The support surfaces of each support element help define, with the adjacent support element, a sufficient supporting surface to accommodate rounded products.

Positioned on the mounting pins 28 are off-loading elements 42. The off-loading elements 42 are pivotally mounted to the endless roller chain 10 by means of the mounts 24. Each off-loading element 42 includes a mounting portion 44 having a hole therethrough. The hole receives the mounting pin 28 such that the off-loading element 42 is pivotally mounted to a mount 24.

Each off-loading element 42 also includes a downwardly inclined portion 46. The portion 46 extends to pivot upwardly through the concavity between adjacent supports 32. It is inclined downwardly away from the chain 10 to face the concavity in a retracted position. This retracted position can be seen, for example, in FIG. 2 on the left of the Figure. The portion 46 is displaced along the chain 10 from the axis defined by the pin 28 toward the concavity and extends downwardly as well as outwardly away from the chain 10.

When the portion 46 is actuated to pivot upwardly, the downward incline presents a horizontal component of force against the product unit so as to insure movement of the unit laterally from the conveyor. The arrangement of the portion is such that even with the off-loading element 42 pivoted to a position at the upper extent of the rollers, as seen in FIG. 2 on the right of the Figure, the portion may still be inclined downwardly away from the roller chain 10. Further, the portion 46 extends more than half way across the concavity. In this embodiment, the portion 46 of the off-loading element 42 is designed to off-load all product units upon actuation.

The off-loading element 42 also includes a downwardly extending arm 50 depending from the mounting portion 44. Naturally, this arm 50 may extend in any convenient direction so as to avoid interference with the product units. Through this arm 50, the pivotal orientation of the off-loading element 42 may be controlled so as to allow placement or induce removal of product units from the concavity defined by the supports 32. The arm 50 includes a surface 52 which cooperates with the stop 30 to limit pivotal motion. A surface 54 on the main portion of the off-loading element 42 locates the element in the retracted position.

To control the off-loading elements 42 by means of the arm 50, the support structure 18 includes a depending mounting member 56. The mounting member 56 supports an actuator having a solenoid 58. The solenoid 58 is arranged as can best be seen in FIGS. 2 and 3. The solenoid 58 includes a pivotal arm 62. The arm 62 pivots as seen in FIG. 2 to interfere with the path of travel of the arms 50 of the off-loading elements 42. When the actuator arm 62 is caused to rotate upwardly, an arm 50 moving along the conveying path encounters the arm 62 and moves upwardly. The off-loading element 42 associated with this arm 50 is caused to rotate upwardly with the downwardly inclined portion 46 moving through the concavity between supports 32. This fully pivoted position is illustrated in FIG. 2. By this operation, the product unit is displaced from the concavity of the conveyor and off-loaded. A plurality of solenoids 58 with arms 62 may be arranged along the conveyor path to provide a plurality of off-loading stations. The mounting member 56 is affixed to the support structure such that it may be easily adjusted vertically. As all the solenoids 58 may be mounted on the same member 56, adjustment may easily be made to all actuators to accommodate selected products.

In operation, the endless roller chain 10 is driven in a conventional manner by a motor about sprocket wheels. On the upper pass of the chain, it rides along a straight conveying path defined by the runner 20. Product units are deposited on the conveyor such that they become positioned in the concavities between supports 32. A means for sensing size, shape, color or other attribute may then view the product units once placed on the conveyor. The motion of the chain is indexed such that when the sensed product unit reaches the desired place for off-loading, the solenoid 58 is actuated. Actuation of the solenoid 58 causes the arm 62 to rotate into the path of travel of the appropriate arm or arms. This causes the arm to ride upwardly over the actuator arm 62. In turn, the off-loading element 42 associated with each actuated arm 50 is pivoted such that the associated downwardly inclined portion or portions 46 of off-loading elements 42 swing upwardly through the conveyor to off-load product units. The products may be softly deposited on associated curtains which run along with the supports 32. By virtue of the curtain flexibility and softness, the units avoid being injured. The product units then roll from the curtains into the appropriate container, shoot, bag or other arrangement. In this way, product units may be separated by appropriate physical attribute.

Peripheral devices and processes known in the industry are intended to be incorporated with the present system. Feeding to the conveyor may be accomplished by a plurality of mechanisms. One such mechanism is to employ a flume of water defined by a narrowing channel. As the channel narrows, the product units may be singulated and sped up to the approximate velocity of the conveyor. The flume may then simply discharge onto the top of the conveyor such that product units are gently placed thereon for processing.

A curtain system as provided by the curtains mentioned above is but one mechanism for handling off-loaded product units. Simple slots or guideways may be provided with or without the curtain members. Selected units discriminated by size, color or other physical attribute may be off-loaded at any particular station in conjunction with a ramp. Naturally, one of the off-loading stations can simply be the end of the chain conveyor where the chain proceeds around the sprocket.

Thus, off-loading conveyors are disclosed which accommodate specific product units of a wide variety of sizes and shapes for conveying and off-loading in a rapid and efficient manner. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. An off-loading conveyor of product units, comprising
   a support structure defining a conveying path;
   an endless flexible member mounted on said support structure to extend along said conveying path;
   supports mounted to said endless flexible member, said supports being mutually spaced apart and including support surfaces defining concavities between adjacent said supports;
   off-loading elements pivotally mounted on said endless flexible member about axes perpendicular to said conveying path, extending to between adjacent said supports, respectively, and having downwardly inclined portions facing adjacent said concavities, respectively, to off load product units away from said endless flexible member when selectively pivoted.

2. The off-loading conveyor of claim 1 further comprising actuators mounted to said support structure, each said off-loading element including a downwardly extending arm, said actuators being selectively movable into the path of travel of said arms.

3. The off-loading conveyor of claim 2 further comprising stops on said endless flexible member, said stops interfering with the pivotal movement of said off-loading elements to restrict said pivotal movement to selected angular range.

4. The off-loading conveyor of claim 2 wherein said actuator is adjustably mounted to said support structure toward and away from the path of travel of said arms.

5. The off-loading conveyor of claim 1 wherein said supports are concave rollers rotatably mounted to said endless flexible member.

6. The off-loading conveyor of claim 5 further comprising mounting pins extending laterally of said endless flexible member, said off-loading elements and said rollers being mounted thereto.

7. The off-loading conveyor of claim 5 wherein said off-loading elements extend laterally of said endless flexible member to in excess of half way along the length of said rollers.

8. The off-loading conveyor of claim 1 wherein said endless flexible member is a roller chain.

9. An off-loading conveyor of product units, comprising
   a support structure defining a conveying path;
   an endless flexible member mounted on said support structure to extend along said conveying path;
   supports mounted to said endless flexible member, said supports being mutually spaced apart concave rollers rotatably mounted to said endless flexible member to define concavities between adjacent said supports;
   off-loading elements pivotally mounted on said endless flexible member about axes perpendicular to said conveying path, extending to between adjacent said supports, respectively, and having downwardly inclined portions facing adjacent said concavities, respectively, to off load product units away from said endless flexible member when selectively pivoted;
   actuators mounted to said support structure, each said off-loading element including a downwardly extending arm, said actuators being selectively movable into the path of travel of said arms to selectively pivot said off-loading elements.

* * * * *